United States Patent [19]

Singh

[11] Patent Number: 4,618,320

[45] Date of Patent: Oct. 21, 1986

[54] TIRE PRESS AND LOADER

[75] Inventor: Anand P. Singh, Youngstown, Ohio

[73] Assignee: NRM Corporation, Columbiana, Ohio

[21] Appl. No.: 804,460

[22] Filed: Dec. 4, 1985

[51] Int. Cl.⁴ .............................................. B29H 5/02
[52] U.S. Cl. ................................................... 425/38
[58] Field of Search ......................... 425/38, 31, 36, 19

[56] References Cited

U.S. PATENT DOCUMENTS

| | | | |
|---|---|---|---|
| 3,065,503 | 11/1962 | Mallory et al. | 425/38 |
| 3,309,737 | 3/1967 | MacMillan | 425/19 |
| 3,380,115 | 4/1968 | Soderquist | 425/38 |
| 3,550,196 | 12/1970 | Gaguit | 425/38 X |
| 3,924,983 | 12/1975 | Barton et al. | 425/38 |
| 4,025,251 | 5/1977 | Cantarutti | 425/31 |
| 4,131,402 | 12/1978 | Pirovano | 425/38 |
| 4,169,698 | 10/1979 | Turk et al. | 425/38 X |
| 4,279,438 | 7/1981 | Singh | 425/38 X |

Primary Examiner—J. Howard Flint, Jr.
Attorney, Agent, or Firm—Renner, Otto, Boisselle & Lyon

[57] ABSTRACT

A tire press and loader achieves precision and accuracy in positioning an uncured tire on or near the bottom mold section after the top mold section has been moved to open the press. The loader utilizes a horizontally movable carriage which is mounted on a track system for shuttling between a pick-up and loading position through the action of a cable piston-cylinder assembly. The track system includes a rod rail at one side with preloaded spaced ball bushings riding thereon and a channel rail at the other side with three spaced rollers riding therein with the center roller being eccentrically loaded against one side of the channel in turn to load the other rollers against the opposite side of the channel. A pair of loader chucks are mounted on the lower ends of vertically movable posts which are each supported by vertically spaced sets of three rollers on the carriage. Vertical motion of the posts is obtained by a rack and pinion system with an electric motor and brake drive which drives the pinions through a non-back driving worm reducer transmission. The pinions engage racks mounted on the posts. In this manner uncured tires may be positioned in the press in a short cycle time with a high degree of repeatable precision.

27 Claims, 4 Drawing Figures

TIRE PRESS AND LOADER

DISCLOSURE

This invention relates generally as indicated to a tire press and loader and more particularly to a tire loader with a short cycle time and repeatable precision and accuracy of movement.

BACKGROUND OF THE INVENTION

Conventional tire presses of the "slide back" or "tilt back" type normally employ loaders at the front of the press which are operative to pick up a green or uncured tire from a loading stand in the front of the press and position it on or closely adjacent the bottom mold section of the press, when opened.

In loaders such as seen in Mallory et al U.S. Pat. No. 3,065,503, the loader may be mounted on a carriage vertically movable on rails in turn mounted on brackets secured to the press head. Vertical movement of the carriage is obtained by a chain drive. Horizontal movement of the carriage is obtained by the opening and closing of the press head.

In tilt back type presses, the loader carriage may be mounted on fixed stanchions at the front of the press, but the carriage is nonetheless again driven by a chain drive. Reference may be had to Barton et al U.S. Pat. No. 3,924,983 for an example of a loader for such tilt back press. Horizontal movement is obtained by a carriage mounted on the vertically movable chain drive driven carriage, such horizontal movement being obtained by a cable piston-cylinder assembly.

Other types of loaders for other types of presses have been utilized. For example, there is illustrated in Gazuit U.S. Pat. No. 3,350,196 a rolling beam servicing a series of presses which incorporates an uncured tire chuck mounted on a rod-type post. Gazuit indicates a conventional screw or rack-type mechanism may drive the post. Cantarutti U.S. Pat. No. 4,025,251 also illustrates a tire press utilizing a rolling beam loader with the chuck mounted on a vertically oriented piston-cylinder assembly. Such loaders are normally quite adequate for the production of conventional tires and generally achieve, to applicant's knowledge, a degree of precision and accuracy which might normally be measured in fractions of an inch. However, such loading tolerances are unacceptable in the precision production of radial tires or modern machining or assembly utilizing the transfer of heavy round objects. In the tire vulcanizing process, excessive tolerance in the loading of the uncured tire may result in bead distortion or misalignment of the uncured tire with the mold sections and the bladder center mechanism. Since tires are quite heavy, especially truck tires, it is important in the loading process to be able to move the tire from one position to another in a short time and stop the tire in the desired position with a repeatable accuracy of, for example, plus or minus 0.005 inches.

SUMMARY OF THE INVENTION

A tire press and loader achieves the noted short cycle time and precision and accuracy in positioning an uncured tire on or near the bottom mold section by utilizing a horizontally movable carriage which is mounted on a track system for shuttling between a pick-up and loading position through the action of a cable piston-cylinder assembly. The track system includes a rod rail at one side with preloaded spaced ball bushings riding thereon and a channel rail at the other side with three spaced rollers riding therein with the center roller being eccentrically loaded against one side of the channel in turn to load the other rollers against the opposite side of the channel.

For a typical dual cavity press, a pair of loader chucks are mounted on the lower ends of vertically movable posts which are each supported by vertically spaced sets of three rollers on the carriage. The posts have an inwardly directed V-shape edge and two of the rollers of each set are angled to receive that V with the opposed roller of each set being loaded to press and align the post into the notch of the V-arranged rollers. This maintains the posts parallel and plumb with respect to the horizontal movement of the carriage.

Vertical motion of the posts is obtained by a rack mounted on each post with a pinion in engagement with the rack. A motor-brake unit drives each pinion through a non-back driving worm reducer transmission with double output shafts. Thus, when the motor and brake unit stops, the non-back driving gear ratio eliminates the need for additional safety brakes.

Adjustable physical stops control the position limits of the travel of the horizontal carriage while position sensors control the motor-brake unit. In a dual cavity press, the rack and pinion drive not only precisely vertically positions the chucks and any uncured tire held thereby, but also ensures that the chucks and tires for each cavity move in unison.

In any event, there is provided a tire press and loader wherein the loader has a very short overall cycle time and a repeatability accuracy of on the order of plus or minus 0.005 inches.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

Figure 1:
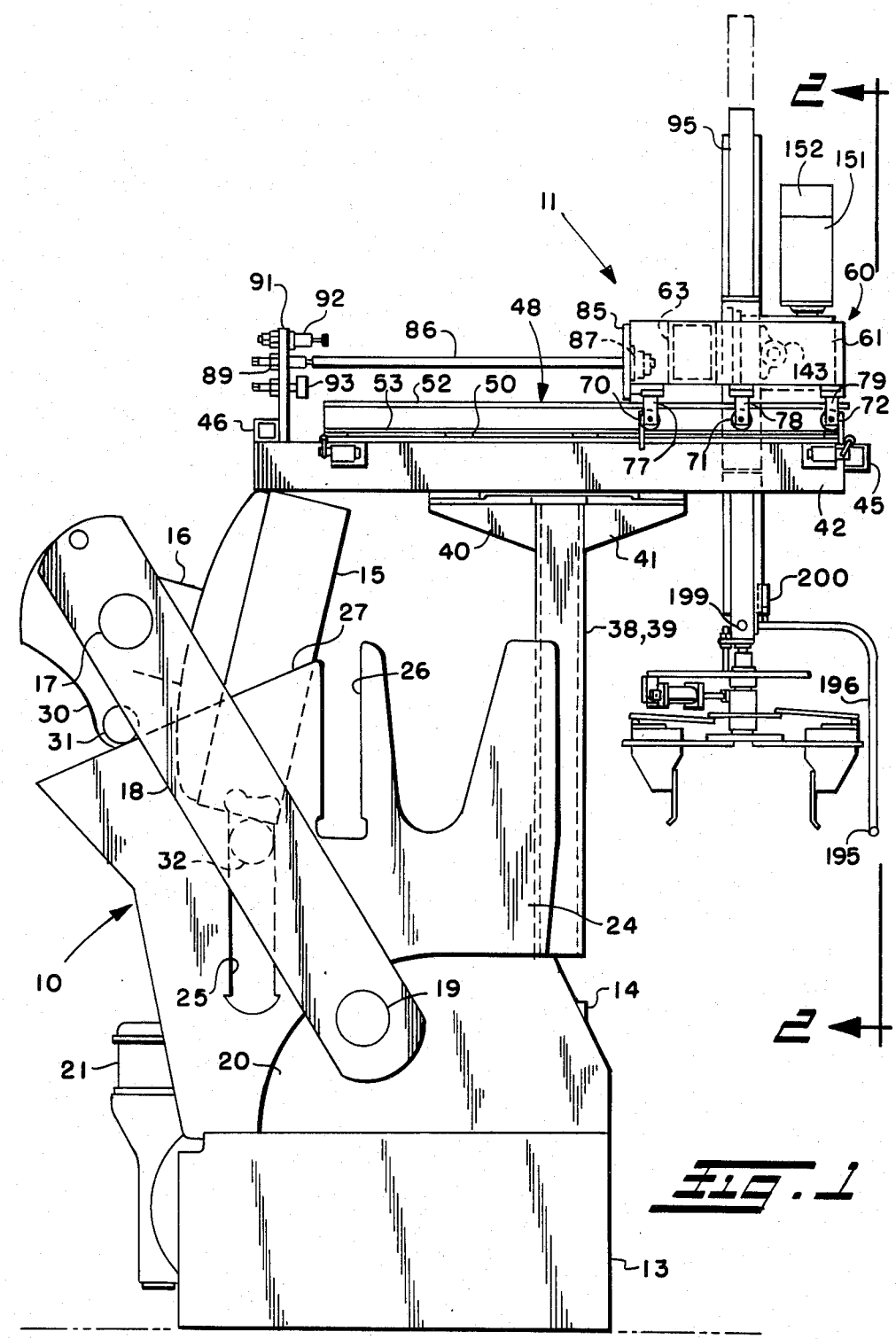
FIG. 1 is a side elevation of a tire press and loader in accordance with the present invention.

Referring first to FIG. 1, there is illustrated a tire press shown generally at 10 with the loader for that press shown generally at 11. As illustrated in FIG. 1, the tire press 10 is a typical "tilt-back" press of the dual cavity type which includes a base 13 on which is mounted fixed side-by-side bottom mold sections 14. Side-by-side upper mold sections 15 are mounted in pendent fashion from a transverse beam 16 which is pivotally mounted on trunions 17 to the upper ends of two side links 18. The lower end of the side links 18 is secured by trunions 19 to bull gears 20 at each side of the press which are driven for rotation by motor drive unit 21 mounted at the back of the press.

Extending upwardly from each side of the press are side plates 24 which include parallel slots 25 and 26, the latter slot opening through the top of the plate and communicating with an inclined or sloped upper rear edge 27 of such plate. At each end of the beam there is provided a bracket arm 30 which includes a roller 31 which rides along the top edge 27 of the plate and vertically within the slot 27 during the closing the opening movements of the press. The press head or upper mold sections also include rollers 32 mounted on suitable brackets which ride vertically within the slot 25.

The press is shown in its partially open position. In such position the upper mold section has been moved vertically in parallelism with the bottom mold section and then has tilted back to the position shown. In the full open position the press head clears the bottom mold section for both unloading of the cured tire and loading of the uncured tire. This is accomplished by counter-clockwise rotation of the bull gear as seen in FIG. 1. Clockwise rotation causes the press head to close as indicated in FIG. 1 with the roller 31 moving up the slope 27 causing the press head upper mold sections to pivot in a clockwise direction as seen in FIG. 1. As the roller 31 becomes aligned with the slot 26, the upper mold sections will have pivoted to a horizontal position and both rollers 31 and 32 will move downwardly in the parallel slots to close the press with the upper mold section 15 closing on the fixed bottom mold section 14. The construction of the "tilt-back" press is well known in the industry and requires no further explanation.

The loader 11 includes stanchions 38 and 39 which may be mounted to the interior of the front edge of the side plates 24. Each stanchion at their upper ends includes fore and aft extending gussets seen at 40 and 41 in FIG. 1 supporting horizontally fore and aft extending tubular support elements 42 and 43. Such support elements are interconnected front and rear by somewhat smaller tubular stringers 45 and 46, respectively. The horizontally extending tubular elements in turn support a horizontally extending track system which on one side, or the left hand side is viewed in FIG. 2, includes a channel 48, and on the right hand side as viewed in FIG. 2, a hardened rod rail 49. As indicated in FIG. 1, both the channel and the rod rail may be mounted on the tubular horizontals 42 and 43 with spacer pads 50 ensuring both are horizontal and parallel.

As indicated, the channel 48 includes outwardly directed top and bottom flanges 52 and 53, respectively, while the rod rail 49 includes a rod supported on and secured to the top of a more narrow member 55. Mounted on the track system which includes the channel 48 and the rod rail 49 is a carriage shown generally at 60. The carriage includes two fore and aft extending tubular frame members 61 and 62 and a single transverse tubular frame member 63. The carriage 60 beneath the horizontal frame member 62 is provided with horizontally spaced preloadable ball bushings 65 which ride on the rod rail 49. These loadable ball bushings preclude any slack or play with regard to the movement along the rod rail 49.

Figure 4:
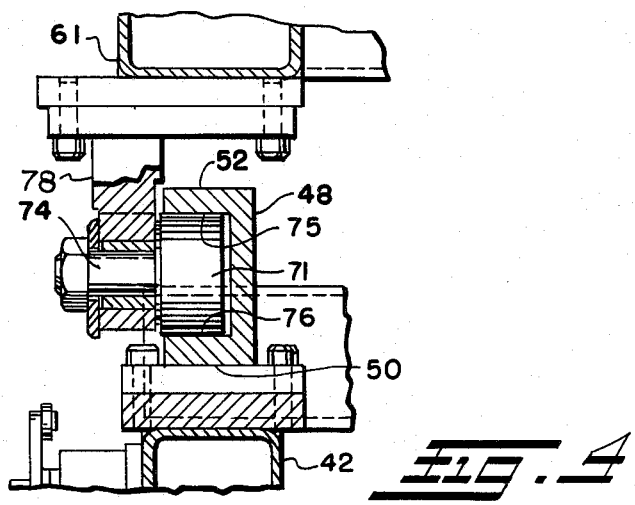

The track system at the opposite edge of the carriage includes journalled rollers 70, 71 and 72. These rollers are in the form of stub shaft mounted cam-rolls. However, the center roll 71 is mounted on a stub shaft 74 which is eccentric to the axis of the roll 71. Thus by rotating the stub shaft about its axis, the roll 71 may be loaded against the underside of the channel rail as indicated at 75 in FIG. 4. This then loads the two outside rolls 70 and 72 against the lower interior of the channel indicated at 76. The eccentric roll may be locked in its loaded condition by the nut 77. Further loading may take up any slack which develops due to wear. Each of the stub shafts of the cam rolls are mounted on depending ears seen at 77, 78 and 79 in FIG. 1 depending from pads secured to the underside of the carriage frame 61. Thus, the track system for such carriage includes an outwardly directed channel on one side in which the three rollers are positioned and which may be loaded against vertically vertical sides of the channel. On the opposite side the track system includes the rod rail on which the fore and aft ball bushings are mounted. In this manner, a linear precision of movement is obtained without any slack or play in the system.

Figure 2:
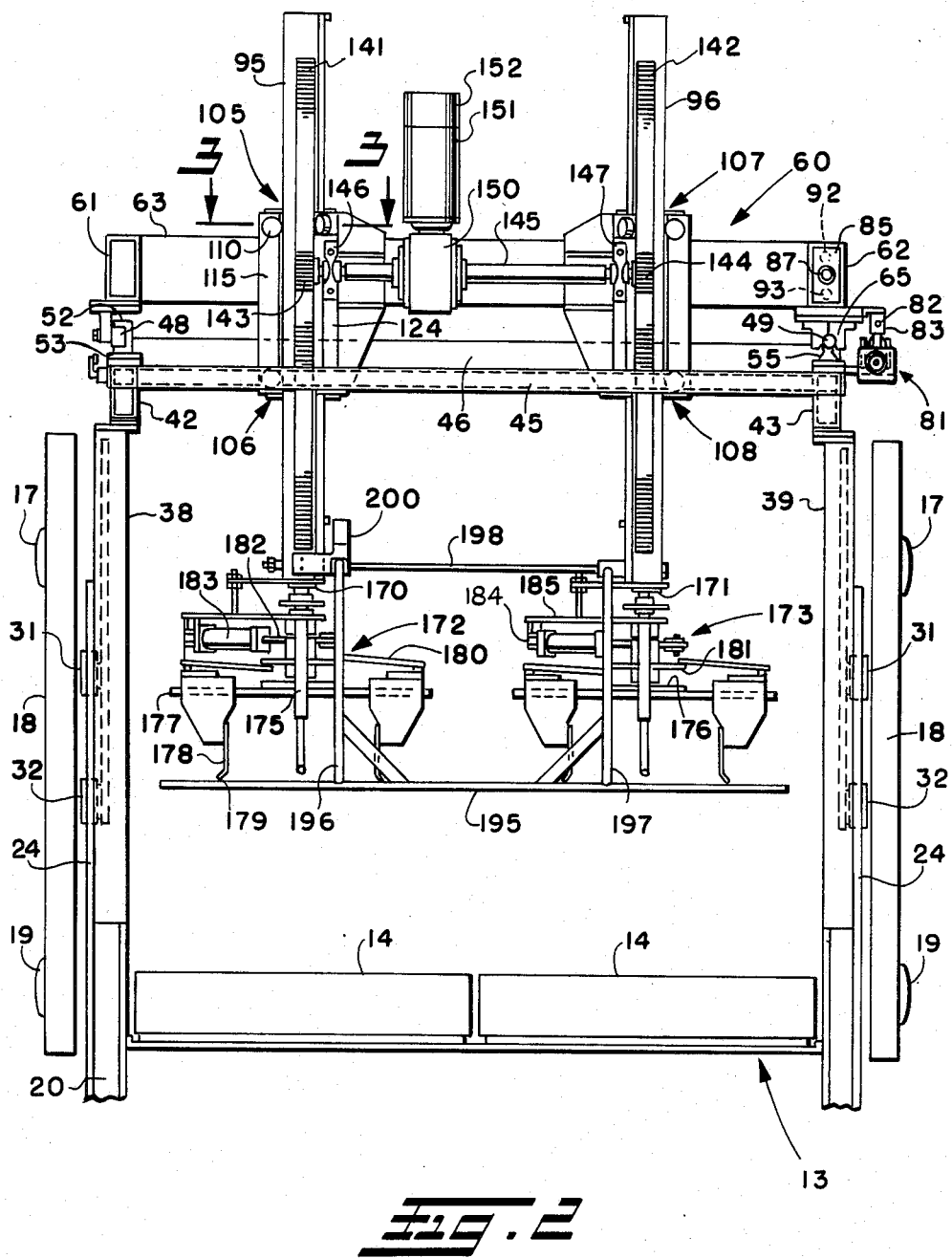
FIG. 2 is a fragmentary front elevation of the press and loader as seen from the line 2—2 of FIG. 1.

Horizontal movement of the carriage 60 is obtained by a cable piston-cylinder assembly seen at the right hand side of FIG. 2 with the cable of such assembly being connected at 82 to bracket 83 secured to the carriage. It will be appreciated that the cable extends around the pulleys at each end of the cylinder and that as the piston of such assembly moves toward the viewer in FIG. 2, the cable connection pulls the carriage away from the viewer, and vice versa.

As seen in FIG. 1, the end of the tubular carriage frame 62 is provided with a plate 85 secured to the end thereof through which extends rod 86. Such rod is provided with a stop abutment 87 on the interior of the tubular frame 62. The rod is also adjustably secured at 89 to upstanding bracket or stanchion 91 secured to the rear end of horizontal fixed frame 46. Also secured to the bracket 91 is a shock absorber 92 and an adjustable stop 93, both of which are designed to engage the plate 85 in the rear or "load" position of the carriage 60. In any event, the adjustable stop 87 engages the right hand side of the plate 85 in the "pick-up" or forward position of the loader.

Figure 3:
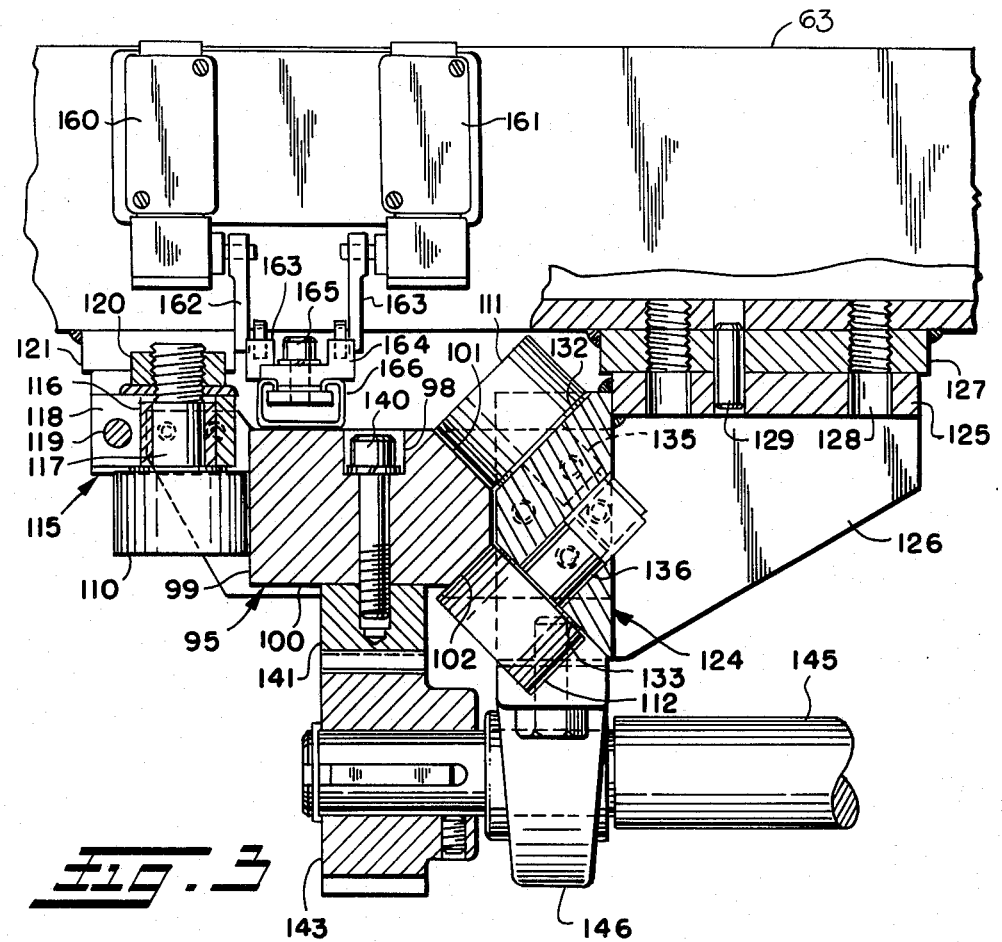
FIG. 3 is an enlarged horizontal fragmentary section through the left hand post at the upper roll set mounting as taken from the line 3—3 of FIG. 2; and, FIG. 4 is a similarly enlarged fragmentary vertical section taken through the center roller on the channel track on the left hand side of the loader as seen in FIG. 2 and as taken from line 3—3 in FIG. 1.

Referring now more particularly to FIGS. 2 and 3, it will be seen that the transverse beam 63 of the carriage 60 has mounted thereon for vertical movement, posts 95 and 96 which have the sectional configuration seen more clearly in FIG. 3. The posts are essentially rectangular bar stock with certain sides or edges finished and parallel. As seen more clearly in FIG. 3, the post includes an inner side 98 positioned toward the carriage frame 63, an end side 99 which is finished, an outer side 100, and V-shape angled sides 101 and 102 opposite the finished side 99, which are also finished with the line intersecting the planes of the surfaces 101 and 102 being parallel to the finished surface 99. The post 96 on the right hand side of FIG. 2 is a mirror image of the sectional configuration of the post shown in FIG. 3.

Each post is supported by a set of three rollers, top and bottom, as indicated generally at 105 and 106 for the post 95 and 107 and 108 for the post 96. As indicated in FIG. 3, the upper roll set 105 includes rolls 110, 111, and 112. The roll 110 is mounted at the top of plate 115. The bushing or sleeve 116 of eccentric stub shaft 117 is mounted in a hole which is horizontally slotted to the edge of the plate as indicated at 118 with fastener 119 clamping the sleeve in place. Again the stub shaft may be rotated with the eccentric mounting loading the roller 110 against the surface 99. The adjustment may be locked in place by nut 120. The plate is fastened to the face of the beam 63 on suitable pads 121. The corresponding roll of the set 106 is mounted on the lower end of the plate 115 in the same manner.

The rolls 111 and 112 are slightly vertically offset and are mounted in the upper end of vertical block 124, such block being secured to plate 125 and suitable horizontal gusset 126. The plate 125 is secured to the face of the beam 63 through the pad 127 with the use of suitable fasteners extending through the holes 128. Dowel pins seen at 129 assist in assembly and location of the plate. Suitable dowel pins may also be employed in the assembly and location of the plate 118.

The upper and lower interior corners of block 124 are cut away on the 45° angles indicated at 132 and 133 and the stub shafts of the respective rollers 111 and 112 are secured through the rear of the block as indicated at 135 and 136, respectively. The corresponding rollers of the set 106 at the bottom of the block 124 are mounted in the same manner. It will be appreciated that a horizontal section through the post 96 and its supporting rollers will be a mirror image of what is viewed in FIG. 3.

Mounted to the front face of each post through the fasteners 140 is a rack as seen at 141 and 142. In engagement with each rack is a pinion seen at 143 and 144, respectively, which pinions are mounted on the ends of shaft 145 journalled in pillow blocks 146 and 147 mounted on the face of blocks 124. The shaft 145 is also the output shaft of the worm wheel of the worm gear transmission indicated at 150 with the worm of such transmission being driven by reversable electric motor 151, such motor including a brake unit 152. In this manner energization of the motor in a selected direction causes the posts to move vertically. When the motor is off, the brake unit is on. However, the wedge angle between the worm and wheel is such that even with the brake off the shaft will not freely turn. The rack and pinion system with the pinions interconnected by the shaft 145 also acts as a squaring mechanism to ensure that the posts move in unison.

As seen more clearly in FIG. 3, the vertical extent of movement may be controlled by limit switches 160 and 161, the trip arms 162 and 163 of which may be controlled by adjustable stops 163 and 164, respectively. Such stops are secured by fasteners 165 at any selected vertical position along channel 166 secured to the rear face 98 of the post 95.

Mounted on the lower end of each post is a flanged threaded stud assembly seen at 170 and 171 to which chuck assemblies 172 and 173, respectively, are secured. The flanges of such assemblies are adjustable so that the loader chuck supported by such assemblies may be centered both with respect to the "pick-up" and "load" positions.

Briefly, the loader chuck assemblies include a center stanchion 175 at the lower end of which is provided an annular plate 176 from which extend radially extending plates 177 on which are mounted chuck shoes 178 which are slightly curved and which have a bead engaging lower lip 179. The chuck shoes are connected to links seen at 180 which are connected to rotary circular plate 181 which is driven for rotation by a rod 182 of piston-cylinder assembly 183. The piston-cylinder assembly is mounted on bracket 184 of arm 185 extending in fixed manner from the stanchion 175. The links 180 may be connected both to the chuck shoe assemblies and the plate 181 by ball-joint assemblies so that extension and retraction of the piston-cylinder assemblies rotating the plate 181 causes the chuck shoe assemblies to move radially along their radially extending plates 177. By location of suitable stops, the extent of radial movement of the chuck shoe assemblies may be closely controlled. Reference may be had to prior U.S. Pat. No. 4,279,438 for a more detailed disclosure of the chuck assembly. It will, of course, be appreciated that other chuck shoe asemblies may be utilized with the present invention such as that shown in a copending application of Thomas A. Crumbacher, et. al. Ser. No. 733,143, filed Apr. 15, 1985, entitled "Tire Loader and Basket".

Also, as shown more clearly in FIGS. 1 and 2, the loader may include a safety bar seen generally at 195 which is mounted on angled arms 196 and 197 secured to transverse rod 198 pivoted at 199 between the lower ends of the posts 95 and 96. Any movement of the safety bar thus trips limit switch 200 which will stop the loader at any point during its cycle.

With the track system illustrated and the vertically mounted posts which are plumb with respect to the horizontal movement of the carriage, a loader with both a short cycle time and high precision and accuracy is achieved.

What is claimed is:

1. In combination a tire press including side-by-side fixed bottom mold sections, vertically movable side-by-side top mold sections, thus movable to open and close the press, and a loader operative to place uncured tires on or near the bottom mold sections when the press is open, said loader comprising a carriage frame movable fore and aft of the front of the press, means to move said carriage frame fore and aft, vertically movable posts mounted on said frame, a loader chuck on the lower end of each said post, said chucks and posts being aligned with pick-up positions in the fore position of the carriage, and being aligned with the bottom mold sections in the aft position of the carriage, and squaring mechanism means to move said posts vertically in unison thus to load uncured tires in the molds of the press as aforesaid.

2. The combination set forth in claim 1 wherein said squaring mechanism means comprises a rack and pinion interconnecting said posts to ensure said posts move vertically in unison.

3. The combination set forth in claim 2 including racks on each post, pinions in engagement with said racks, and a shaft interconnecting said pinions.

4. The combination set forth in claim 3 including a reversible motor driving said shaft for rotation thus to elevate and lower said posts in unison.

5. The combination set forth in claim 4 including a non-back driving worm gear transmission driven by said motor driving said shaft.

6. The combination set forth in claim 5 wherein said motor includes a brake.

7. The combination set forth in claim 1 wherein each post is mounted on said carriage frame by means of upper and lower roll sets, at least one roll of each set being loadable toward an opposed roll of said set.

8. The combination set forth in claim 7 including two opposed rolls in each set, said opposed rolls being arranged in a V-configuration and bearing against surfaces similarly arranged on each said post.

9. The combination set forth in claim 7 wherein said one roll of each set is loadable by means of an eccentric mounting.

10. The combination set forth in claim 9 wherein each post has a planar outside surface and a V-shape inside surface with loadable rolls of each set bearing against such planar outside surface.

11. The combination set forth in claim 10 wherein said roller sets are mounted on said carriage frame in a vertically spaced relationship.

12. The combination set forth in claim 1 wherein said means for moving said carriage frame comprises a means for mounting said frame on a horizontal track system which includes a rod rail at one side and a channel rail at the other.

13. The combination set forth in claim 12 including fore and aft ball bushings on said carriage frame riding on said rod rail.

14. The combination set forth in claim 13 including at least three rollers on said carriage frame riding in said channel rail.

15. The combination set forth in claim 14 wherein at least one of said rollers may be vertically adjusted and locked in a vertical position.

16. The combination set forth in claim 15 wherein said one of said rollers is eccentrically mounted to load the other two rollers in the opposite direction.

17. A pick and place unit for rather sizable objects such as automobile tires comprising a horizontally movable carriage, parallel rails supporting said carriage for such horizontal movement, said carriage including fore and aft spaced bearings riding on said rails, means to move said carriage fore and aft on said rails, adjustable stop means to limit horizontal movement of said carriage, a vertically movable post mounted on said carriage, a chuck for such objects mounted on the lower end of said post, means to load and maintain said post plumb with respect to the horizontal movement of said carriage, a rack mounted on said post, a pinion engagement with said rack, and a motor-brake unit driving said pinion through a non-back driving worm gear transmission vertically to move said post and thus to raise and lower said chuck.

18. A unit as set forth in claim 17 wherein said post is mounted on said carriage by means of upper and lower roll sets, at least one roll of each set being loadable toward an opposed roll of said set.

19. A unit as set forth in claim 18 including two opposed rolls in each set, said opposed rolls being arranged in a V-configuration and bearing against surfaces similarly arranged on said post.

20. A unit as set forth in claim 19 wherein said roll of each set is loadable by means of an eccentric mounting.

21. A unit as set forth in claim 20 wherein said one roll of each set bears against a planar surface.

22. A unit as set forth in claim 17 wherein said rails include a channel at one side and a rod at the other side.

23. A unit as set forth in claim 22 including at least three rollers on said carriage riding in said channel.

24. A unit as set forth in claim 23 wherein said channel is horizontally directed and at least one of said rollers may be vertically adjusted and locked in such adjusted position.

25. A unit as set forth in claim 24 wherein said one of said rollers is the center of three and is eccentrically mounted to load the other two rollers in the opposite direction.

26. A unit as set forth in claim 22 including fore and aft ball bushings on said carriage riding on said rod.

27. A unit as set forth in claim 17 including two posts mounted on said carriage with a chuck on each post, each post including a said rack with a pinion in engagement therewith with a shaft interconnecting said pinions whereby vertical movement of said posts is maintained in unison.

* * * * *